(12) United States Patent
Basham

(10) Patent No.: US 7,016,982 B2
(45) Date of Patent: Mar. 21, 2006

(54) VIRTUAL CONTROLLER WITH SCSI EXTENDED COPY COMMAND

(75) Inventor: Robert Beverley Basham, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/143,204

(22) Filed: May 9, 2002

(65) Prior Publication Data
US 2003/0212700 A1   Nov. 13, 2003

(51) Int. Cl.
*G06F 3/00* (2006.01)

(52) U.S. Cl. ............... 710/5; 710/100; 707/102; 707/200

(58) Field of Classification Search ........... 710/5, 710/100; 707/102, 200
See application file for complete search history.

(56) References Cited

U.S. PATENT DOCUMENTS

| | | | |
|---|---|---|---|
| 4,862,411 A | | 8/1989 | Dishon et al. ............ 364/952 |
| 5,051,887 A | | 9/1991 | Berger et al. ............ 364/200 |
| 5,155,845 A | | 10/1992 | Beal et al. ............ 395/575 |
| 5,321,816 A | | 6/1994 | Rogan et al. ............ 395/200 |
| 5,553,285 A | | 9/1996 | Krakauer et al. ......... 395/600 |
| 5,574,862 A | * | 11/1996 | Marianetti, II ........... 710/100 |
| 5,790,867 A | | 8/1998 | Schmidt et al. .......... 395/709 |
| 5,996,024 A | * | 11/1999 | Blumenau .............. 719/326 |
| 6,023,709 A | | 2/2000 | Anglin et al. ........... 707/204 |
| 6,745,207 B1 | * | 6/2004 | Reuter et al. ............ 707/200 |
| 2002/0112113 A1 | * | 8/2002 | Karpoff et al. ........... 711/4 |
| 2002/0156942 A1 | * | 10/2002 | Tyndall .................. 710/5 |
| 2003/0167312 A1 | * | 9/2003 | Mori ..................... 709/212 |

* cited by examiner

*Primary Examiner*—Tammara Peyton
(74) *Attorney, Agent, or Firm*—Dale F. Regelman

(57) ABSTRACT

A nested translated extended copy function provides direct storage-to-storage copying with no data passing through the virtual controller. In one embodiment, a method for performing an extended copy operation on a physical drive reserved to a virtual controller comprises: receiving at least one extended copy command for copying from a device having extended copy capability; parsing the extended copy command; translating the extended copy command into at least one translated command; and sending the translated command to a physical drive having extended copy capability. In another embodiment, a method for performing an extended copy operation comprises translating at least one extended copy command into at least one translated command capable of execution by a physical drive having extended copy capability, wherein the physical drive is reserved to a virtual controller. A data storage system consistent with the invention comprises a server, a source device, a target device which is a virtual storage device, and a virtual storage appliance in communication with the server, source device, and target device. The virtual storage appliance is adapted to receive an extended copy command from the server for performing an extended copy operation from the source device, to parse the extended copy command, to build at least one translated command capable of execution by the target device, and to transmit the translated command to the target device.

13 Claims, 6 Drawing Sheets

VIRTUAL CONTROLLER WITH SCSI EXTENDED COPY COMMAND

BACKGROUND OF THE INVENTION

The present invention relates, generally, to data backup systems and methods, and more particularly, to a system and method for direct storage-to-storage copying without data passing through a virtual controller.

Organizations seeking to reduce local area network (LAN) traffic and free up more processing cycles on their servers implementing extended copy methods, also referred to as serverless backup or third-party copy. Extended copy allows a network attached storage device (NAS) to be backed up to a data storage library on a storage area network (SAN) without sending the data over the LAN or through a server. By transferring some of the bandwidth and intelligence required for backup to the SAN, the LAN and its server(s) may be freed up for other, more critical transactional data.

The extended copy command further allows data to be moved between storage devices on different buses. The backup server issues the command to a data mover in the SAN, and then removes itself from the data path. In this manner, only the source, destination and SAN devices are involved. The constraints related to the memory, I/O and CPU performance of the backup server itself are eliminated as the data moves through a high-performance copy device or agent that is optimized for data movement. Thus, a backup server may be freed up for other business-critical applications, and servers may be consolidated, since a dedicated backup server is no longer needed. Additionally, backups can complete much more quickly over higher speed networks, e.g., Fibre Channel.

The backup architecture of systems employing extended copy also may provide the ability to stream the same data to several data storage libraries or other targets simultaneously, even if they are geographically separated, without the need for copying and moving the actual data storage devices, which may be an important advantage in disaster recovery plans.

Backup equipment used in SANs is typically the same as that used in conventional configurations. What is different, however, is how these devices are interfaced to their host servers and client storage systems. Since most contemporary SANs are connected together using Fibre Channel, and since many backup devices use SCSI interfaces, a bridge is often required.

Because the extended copy command involves direct storage-to-storage copy of large quantities of data, it is intended to be very fast. However, this can be problematic when the storage device to which data is being written is a virtual storage device, e.g., a virtual controller, due to the speed demands of the extended copy function. Prior to the present invention, resolution of this issue either required the controller to possess specialized hardware to manage high-speed data rates, or else the extended copy command would suffer from slow performance due to the data copying having to pass through the virtual storage appliance (virtual controller).

SUMMARY OF THE INVENTION

The present invention provides a nested translated extended copy function that still allows for direct storage-to-storage copying with no data passing through the virtual controller.

In one embodiment, a method for performing an extended copy operation on a physical drive reserved to a virtual controller comprises: receiving at least one extended copy command for copying from a device having extended copy capability; parsing the extended copy command; translating the extended copy command into at least one translated command; and sending the translated command to a physical drive having extended copy capability.

In another embodiment, a method for performing an extended copy operation comprises translating at least one extended copy command into at least one translated command capable of execution by a physical drive having extended copy capability, wherein the physical drive is reserved to a virtual controller.

A data storage system consistent with the invention comprises a server, a source device, a target device which is a virtual storage device, and a virtual storage appliance in communication with the server, source device, and target device. The virtual storage appliance is adapted to receive an extended copy command from the server for performing an extended copy operation from the source device, to parse the extended copy command, to build at least one translated command capable of execution by the target device, and to transmit the translated command to the target device.

In another embodiment, an extended copy-capable virtual storage system consistent with the invention comprises a source drive, a target drive which is a physical drive reserved to a virtual controller, and a virtual controller, in communication with the source and target drives, capable of receiving at least one command to copy data from the source drive and translating the command into an extended copy command for transferring data from the source drive to the target drive.

In yet another embodiment, a method for performing an extended copy operation, consistent with the invention, comprises advertising extended copy capability; accepting an extended copy command for transferring data to a virtual storage device; and if the virtual storage device maps 1:1 to a physical storage device, communicating the extended copy command to the physical storage device.

In still another embodiment, a method for performing an extended copy operation, consistent with the invention, comprises: advertising extended copy capability; accepting an extended copy command for transferring data to a virtual storage device; and if the virtual storage device does not map 1:1 to a physical storage device, parsing the extended copy command, building at least one new extended copy command capable of execution by the physical storage device, and communicating the at least one new extended copy command to the physical storage device.

In still a further embodiment, a virtual controller consistent with the invention comprises computer-readable instructions, stored on a tangible medium, for receiving at least one command to copy data from a source drive, and computer-readable instructions, stored on a tangible medium, for translating the command into at least one extended copy command for transferring data from the source drive to a target drive, without the data passing through the virtual controller.

An extended copy software program consistent with the invention comprises computer-readable instructions, stored on a tangible medium, for receiving at least one command to copy data from a source drive, and computer-readable instructions, stored on a tangible medium, for translating the command into at least one extended copy command for transferring data from the source drive to a target drive.

DETAILED DESCRIPTION OF EXEMPLARY EMBODIMENTS

A virtual storage device is a representation of the functionality of a physical storage device, e.g., an IBM 3590 class tape drive, as viewed by a host control program. The data from and to the drive is directed to the tape volume cache, and all drive related commands are emulated through the internal code in the virtual data storage server controller. An exemplary virtualization system comprises a router, a plurality of tape devices (e.g., IBM 3590) and a tape library (e.g., the IBM 3584 tape library). Together, they manage the utilization of the cartridge storage capacity and performance capabilities of the tape device technology transparently to host software and applications.

In one embodiment of the invention, the virtual storage is on the same storage area network (SAN) as the externally available storage, but is permanently reserved to the virtual storage device controller. The actual physical storage owned by the virtual controller has copy command capability, but that capability is usable only to the virtual controller.

To resolve this issue, the virtual controller externally advertises copy command capability and accepts the extended copy commands involving virtual storage that it owns. The virtual controller parses through the extended copy commands and builds a new translated extended copy command to send down to the actual virtual storage device. The conversion is effected through virtual data storage device/physical disk, meta-data, capacity, and other personality issues.

Once the extended copy command is completely parsed and translated, one or more extended copy commands (depending on the meta-data boundaries) are sent to the actual physical storage, thereby allowing for direct storage-to-storage data movement. When the final translated extended copy command is complete, status is sent back relative to the original extended copy command.

Figure 1A:
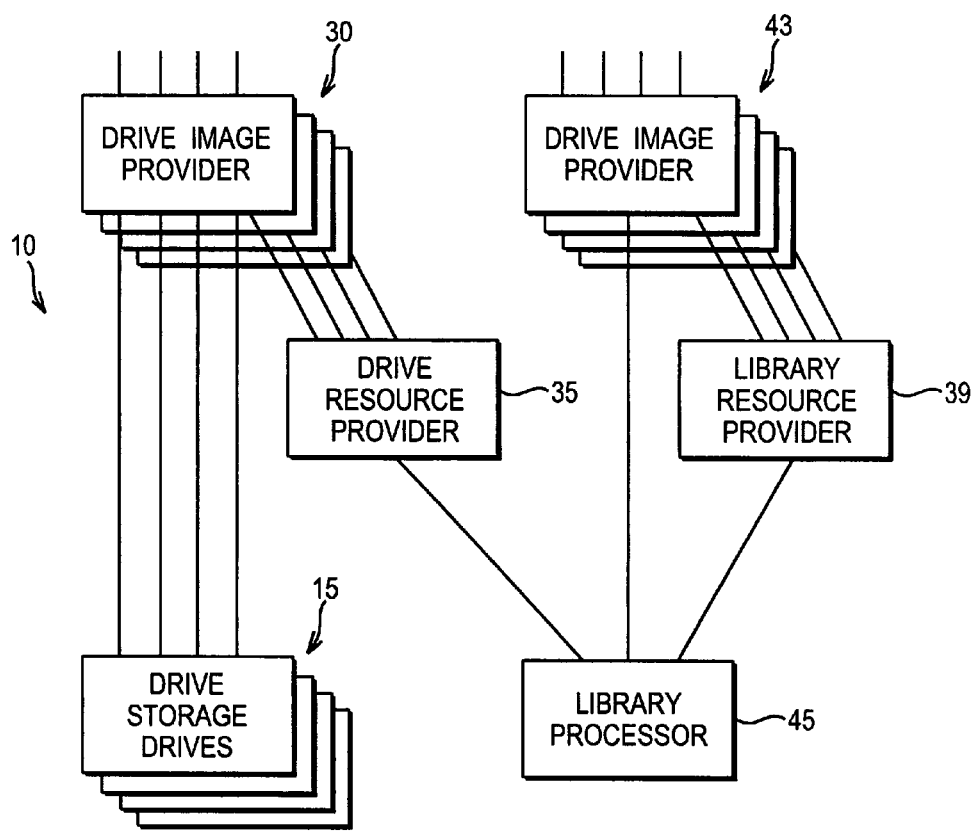
FIG. 1A is a diagrammatic representation of a virtualization system consistent with the present invention.
Figure 1B:
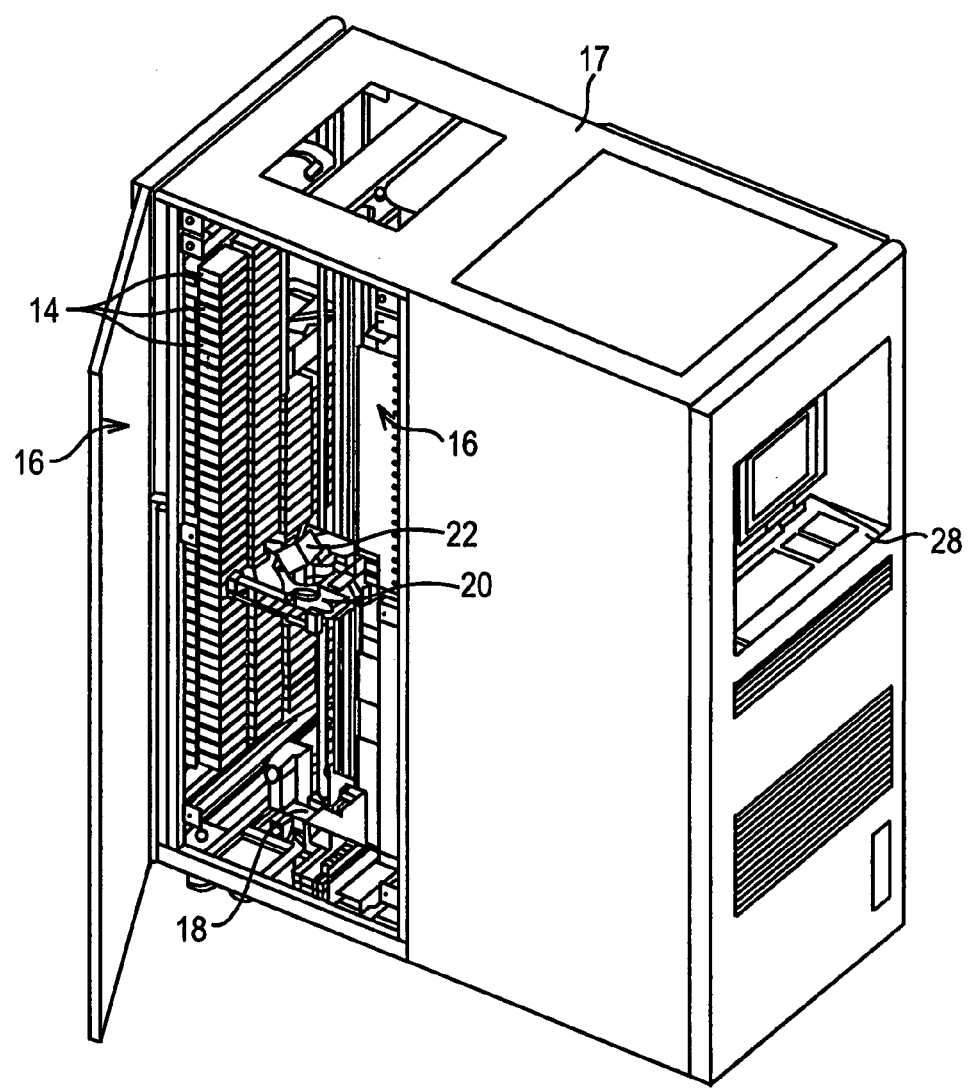
FIG. 1B is an isometric view of an automated data storage library which may implement embodiments of the present invention.
Figure 1C:
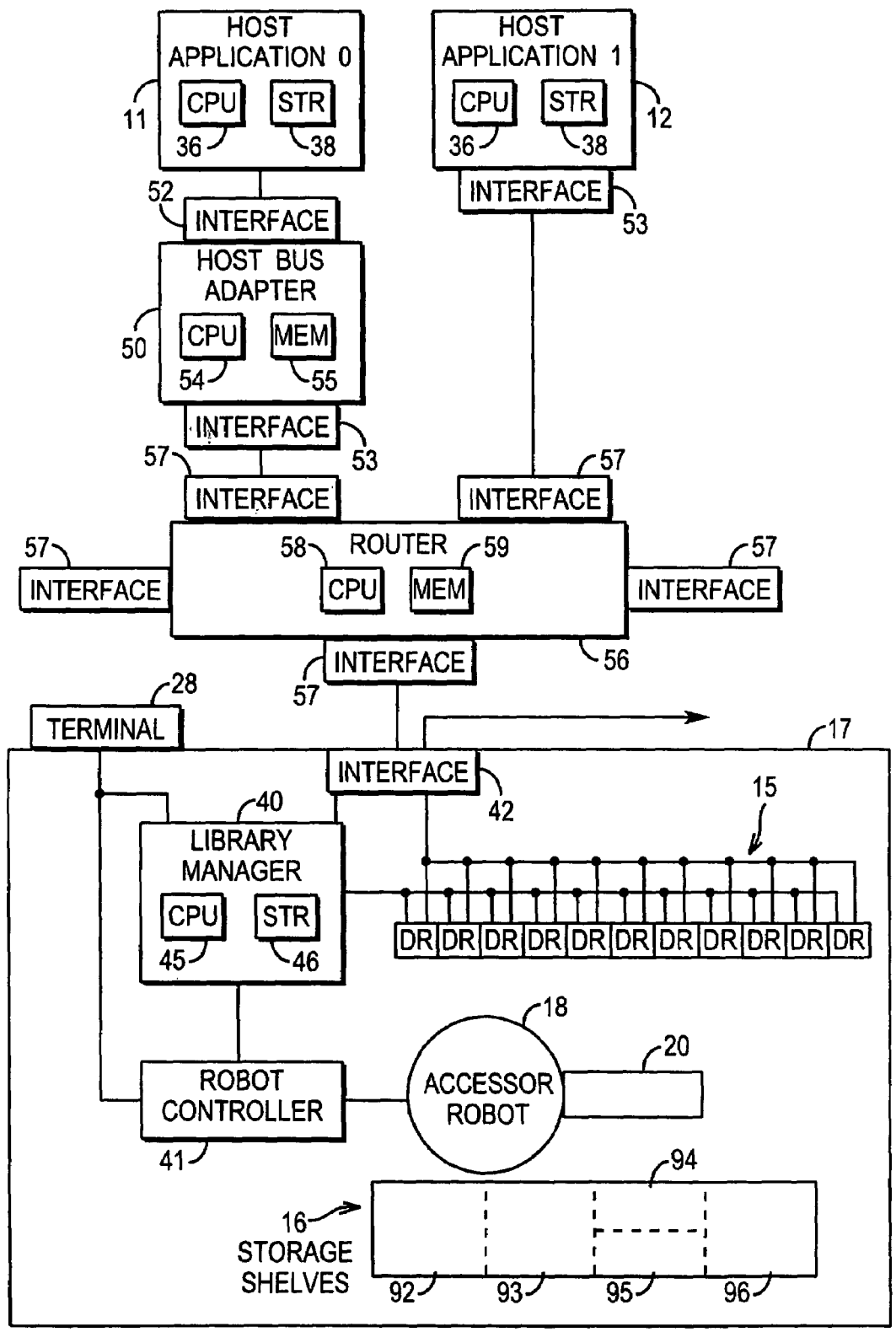
FIG. 1C is a block diagram of the automated data storage library of FIG. 1B, together with host applications and components intermediate the host applications and the automated data storage library which may implement embodiments of the present invention.

Referring to FIGS. 1A–1C, an embodiment of a virtualization system 10 directs communication between host applications, such as host applications 11, 12, and data storage drives 15 of an automated data storage library 17. The library stores a plurality of portable data storage cartridges 14 in storage shelves 16 and provides an accessor robot 18, 20 for transporting the portable data storage cartridges between the storage shelves and the data storage drives.

At least one drive image provider 30 is coupled to one or more host applications 11, 12, and provides an image of at least one fixed virtual data storage drive to each host application, while actually directing communication between the host application and data storage drives of a pool of "n" data storage drives 15 of the automated data storage library. The drives 15 of the library are thus shared between the host applications. The drive image provider depicts the image in communications with the host by employing fixed identifications and fixed sets of responses to the host application for each of the virtual drives, such that the host application is provided with the appearance that all of the host's virtual drives are dedicated to the host all of the time. Further, the underlying physical drives may be different at various accesses, and drives may be added, deleted or replaced, all without requiring a reconfiguration of the host application device driver.

A drive resource provider 35 is coupled to the drive image providers 30. At any one time, the drive resource provider has assigned any number "in" of the pool of "n" data storage drives to the drive image providers, and "n"-"m" of the pool of data storage drives are indicated as freed and available for assignment.

The drive resource provider 35 responds to a triggering event requesting a drive for the host application virtual drive, and dedicates one of the "n"-"m" data storage drives of the pool as the virtual drive, indicating the dedication for the drive image provider for the requesting host application as one of the fixed virtual drives.

The drive image provider 30 characterizes the dedicated data storage drive to the requesting host application as one of the fixed virtual drives, and directs communication to the dedicated data storage drive 15 by the requesting host application 11, 12 as the virtual drive.

Prior to dedication of a physical drive as a virtual drive, the drive image provider 30 responds to a command requiring a physical drive, characterizing the virtual drive to the requesting host application as "not ready". As an example, "not ready" comprises a reported state that no media is loaded in the drive.

In one example, one or more library image providers 43 may also be provided for virtual libraries, and will comprise a set of the virtual drives and a set of the storage shelves 16, which are defined by a library resource provider 39. Data storage drives 15 are shared between virtual libraries, but storage shelves 16 are preferably separate.

A host application 11, 12 may comprise a host processor, such as an IBM RS/6000 or an IBM eServer pSeries processor, and all the applications running on the host processor, or may comprise one of multiple applications running on the host processor. Thus, the host applications are depicted as each comprising a processing system having a processor 36 and storage 38.

The automated data storage library 17, as an example, comprises an automated tape cartridge storage and retrieval library for storing and accessing data storage media comprising physical volumes of magnetic tape cartridges, such as an IBM 3584. Alternatively, the automated data storage library 17 may comprise an optical storage and retrieval library or a tape cassette library, etc., each defined herein as storing portable data storage cartridges. The data storage drives 15 read and/or write data on the media, and may comprise a processor. The library further comprises a robot controller 41 for operating the accessor robot 18, 20, and a library manager 40. The accessor robot 18, 20 comprises a gripper 20 for engaging a selected portable data storage cartridge 14, and an accessor 18 for moving the gripper between a storage shelf 16 and a drive 15, or between storage shelves. The accessor robot 18, 20 may also comprise a bar code scanner 22, or similar vision system, mounted on the gripper 20, to "read" identifying cartridge labels. The data storage drives 15 can be optical disk drives or magnetic tape drives and the portable data storage cartridges can comprise cartridges or cassettes containing optical or magnetic media, respectively, or any other removable storage.

The robot controller 41 and library manager 40, comprise at least one computer processor and associated storage, and are coupled to an input/output interface 42 and a terminal 28. The computer processor may comprise, for example, an IBM RS/6000 processor. Alternatively, robot controller 41 and library manager 40 may each comprise a computer processor, and the computer processors are interconnected. In the example, library manager 40 comprises a computer processor 45 and associated storage 46. The terminal 28 may comprise a station for reading a data storage medium, such as a floppy disk or CD-ROM.

The library manager 40 is coupled with, and controls the load/unload and related actions of, the drives 15, and the library manager 40 is coupled with, and coordinates the operation of the robot controller 41. The library manager is coupled through the interface 42 to the host applications 11, 12. The library manager 24 has a library manager database which is stored in storage 46 (typically one or more hard disk drives or flash EEPROM) for tables and programs. Data access commands and information to be recorded on, or to be read from, selected portable data storage cartridges 14 are transmitted between the drives 15 and the host applications as directed by the data image provider 30. The library manager 40 defines each portable data storage cartridge in terms of its identifier, which is typically a volume serial number, or VOLSER, or, alternatively, in terms of its location.

The host applications 11, 12 are typically coupled to the library 17 by one or more components intermediating the host application and the automated data storage library.

An example of an intermediate component is a host bus adapter 50. In one example, the host bus adapter 50 comprises interfaces 52 and 53 which each interfaces with the appropriate connections to couple to the library or to other intermediate components, and to the host applications 11, 12, such as PCI, ESCON, FICON, SCSI, FIBER CHANNEL, etc. The adapter comprises a processor 54 and non-volatile memory 55, and suitable buffers and interconnections. An example of a host bus adapter 50 comprises an IBM eServer pSeries Gigabit Fibre Channel Adapter. Host application 12 is shown with an interface 53 which may comprise an adapter.

Another example of an intermediate component comprises a gateway or router 56 having a plurality of interfaces 57 with the appropriate connections to interconnecting a number of processors in a network, such as discussed above. The gateway or router comprises a processor 58 with a non-volatile memory 59 for storing the operating system, etc. An example of a gateway or router is the IBM 2108 SAN Data Gateway. Other suitable terminology for the present adapter, router or gateway are "controller", "director" or "intelligent switch", and those of skill in the art may envision other applications.

The processors 54, 58 may comprise microprocessors, such as the Intel i960.

In accordance with the present invention, the drive image providers 30 and/or the drive resource provider 35 may be embedded in any of a host application 11, 12, an intermediate component 50, 56, or the automated data storage library 17. As one example, the drive image providers 30 are each incorporated into a device driver of the associated host application 11, 12, and the drive resource provider is incorporated into a component 56 intermediate the host applications and the automated data storage library 17. The drive resource provider must be at a component coupled to each of the hosts, or host bus adapters of hosts, having a drive image provider. As still another example, the drive image provider(s) 30 comprise a component 50, 56 intermediate the host application(s) 11, 12 and the automated data storage library 17, and the drive resource provider 35 comprises a component 56 intermediate the host bus adapter 50 or host and the library 17. As a further, example, drive image providers 30 comprise device drivers of the associated host applications 11, 12, and the drive resource provider 35 comprises a component of the automated data storage library 17, such as the library manager 40. A still further example comprises the drive image provider(s) 30 as incorporated in a component 50, 56 intermediate the host application and the automated data storage library, and the drive resource provider 35 comprises a component of the automated data storage library 17.

The library image provider(s) 43 and the library resource provider 39 are preferably both incorporated into the automated data storage library 17.

Each of the processors 36 of the host applications 11, 12, processors 54, 58 of the intermediate components 50, 56, and processor 45 of the library manager 40 of the library, may be provided with an operating system and application programs, and may comprise programs for operating in accordance with the present invention. Each processor may be provided with a database, respectively, 38, 55, 59, 46, which includes storage (typically non-volatile memory or one or more hard disk drives) for tables and programs. The application programs may comprise one or more computer program products, comprising computer readable program code. The computer program product of the present invention may be supplied with an application program and stored in the provided storage, may be supplied with a diskette or CD-ROM at terminal 28, and comprises an article of manufacture, may be received from one of the host systems 11, 12, may be received from the network, or may be received by other similar means. The requirement for the storage media or memories is that they store digital representations of computer executable instructions. The computer readable program code operates the devices through their computer processor or processors.

Figure 2:
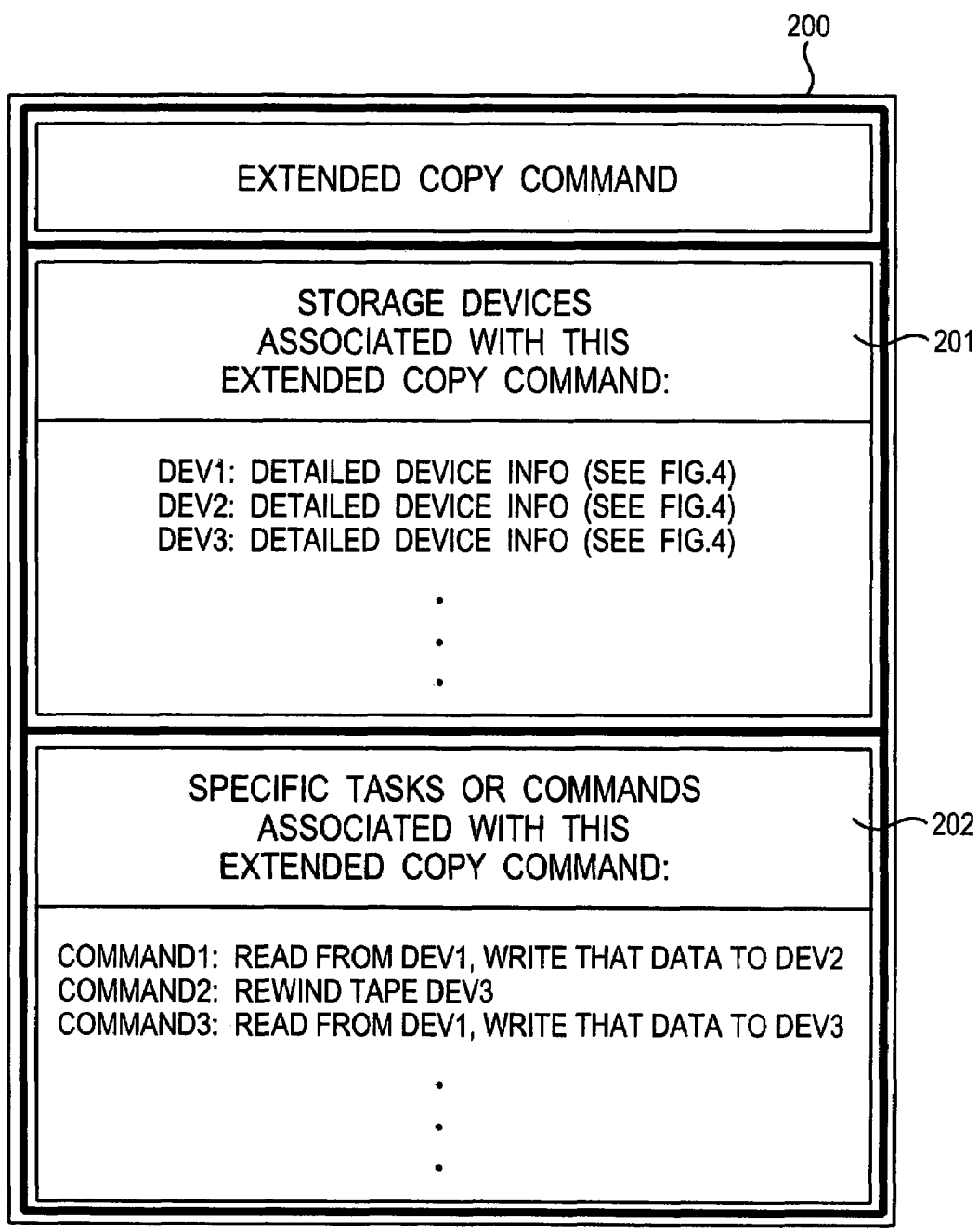
FIG. 2 is a table illustrating graphically an exemplary extended copy command consistent with the invention.

FIG. 2 illustrates graphically in table form an exemplary extended copy command 200 consistent with the invention. Some knowledge of extended copy command capability in the physical devices (e.g., data storage devices 15) can be discovered using standard SCSI mechanisms, so that extended copy commands are only sent to devices with extended copy capability. The virtual storage appliance 17 may need to perform extended copies in cases where no capability exists or where device subsets (e.g., data storage devices 15) do not have the capability. As shown, the extended copy command 200 comprises a list of virtual storage devices 201 (e.g., disks, tapes) associated with the command 200 and associated metadata (e.g., virtual data storage device/physical disk, capacity, and other personality issues, as shown, e.g., in FIG. 4), as well as a list of specific tasks or commands 202 associated with the command 200. It is noted that a single extended copy "command" 200 consistent with the invention may actually comprise a list of many commands that a surrogate entity is being asked to perform.

Since the devices 201 are virtual, there needs to be a mapping from the virtual devices 201 to physical devices. If the mapping between virtual devices 201 and physical devices is 1:1, then the lists of storage devices (e.g., disks, tapes) may be the only information that needs to be processed before sending the command through for the actual physical copy. The command may need to be broken up into multiple copy commands, with pieces going to different copy management functions, allowing the extended copy command to proceed in parallel (making sure that no ordering rules are broken).

If there is not a 1:1 mapping of virtual 201 to physical devices, then the commands will need to be parsed and modified as well. Commands may be split apart, but it is possible to combine commands in some cases.

Figure 3:
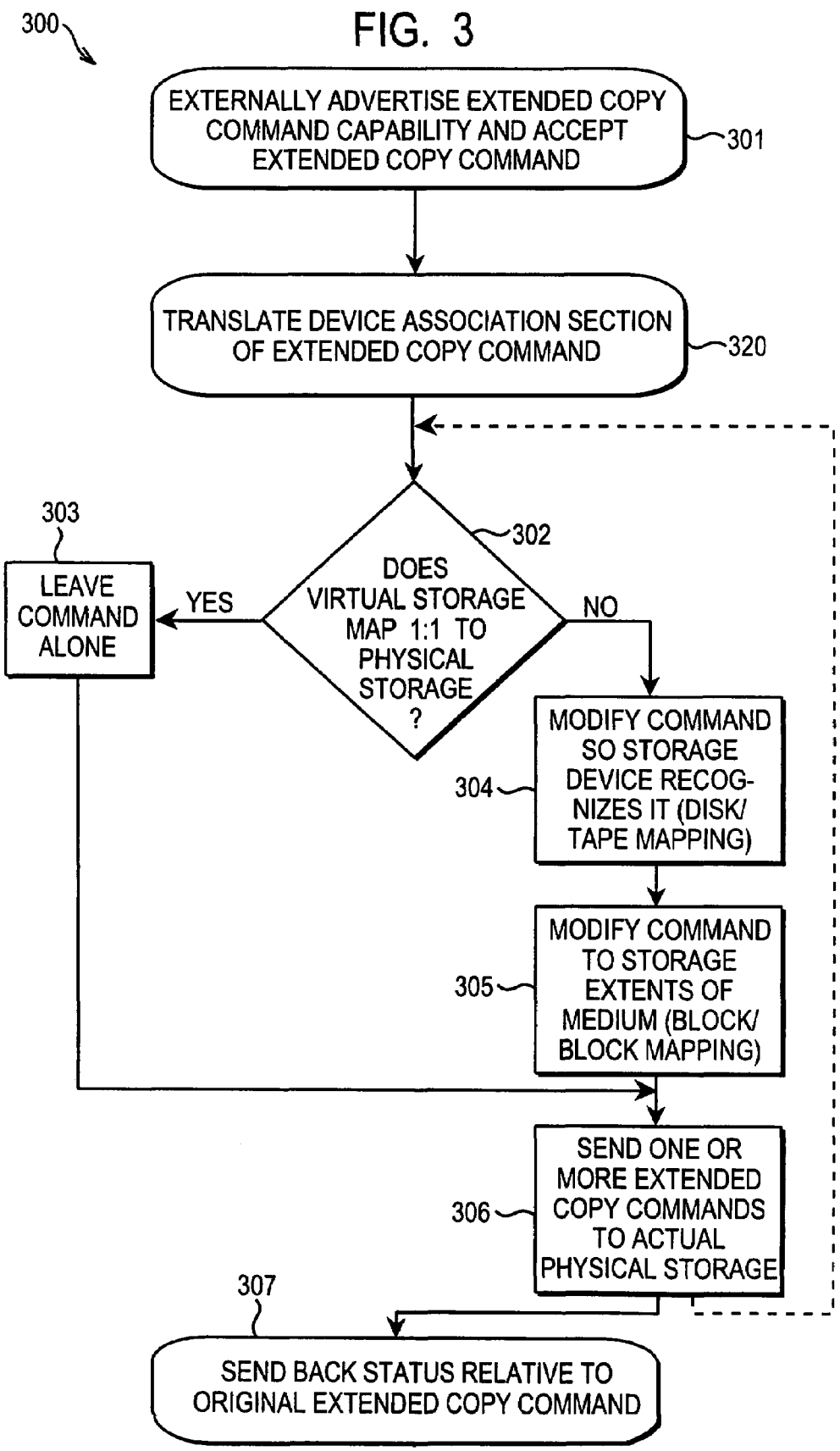
FIG. 3 is a flowchart illustrating an exemplary mapping algorithm consistent with the invention.

FIG. 3 is a flowchart 300, illustrating an exemplary mapping algorithm consistent with the invention. As shown, the algorithm begins at step 301, when the virtual controller (or other virtual storage device controller) externally advertises copy command capability and accepts the extended copy commands involving virtual storage that it owns. The device association section of the extended copy command is then translated 320 (i.e., mapping from virtual to physical devices). A determination is initially made whether the virtual storage maps 1:1 to physical storage, at step 302. If so, the command is left alone, at step 303. If not, then the virtual controller must parse through the extended copy commands and build a new translated extended copy command to send down to the actual virtual storage device, wherein the conversion is effected through virtual data storage device/physical disk, meta-data, capacity, and other personality issues (see, e.g., FIG. 4). At step 304, the command is modified to one that the storage device recognizes (e.g., disk to tape or tape to disk mapping). At step 305, the command is modified appropriately to the storage extents of the medium (i.e., block x in virtual medium maps to blocks x, y, and z in the physical medium). Once the extended copy command is completely parsed and translated, one or more extended copy commands (depending on the meta-data boundaries) are sent to the actual physical storage, at step 306, thereby allowing for direct storage-to-storage data movement. Steps 302 to 306 may be repeated more than once (e.g., as a batch process), iteratively sending copy commands until the operation is complete. When the final translated extended copy command is complete, status is sent back relative to the original extended copy command, at step 307. It should be recognized by those skilled in the art that, in a system or method consistent with the present invention, the foregoing steps may be performed in a sequence other than as described herein and may or may not be executed as a batch process.

Figure 4:
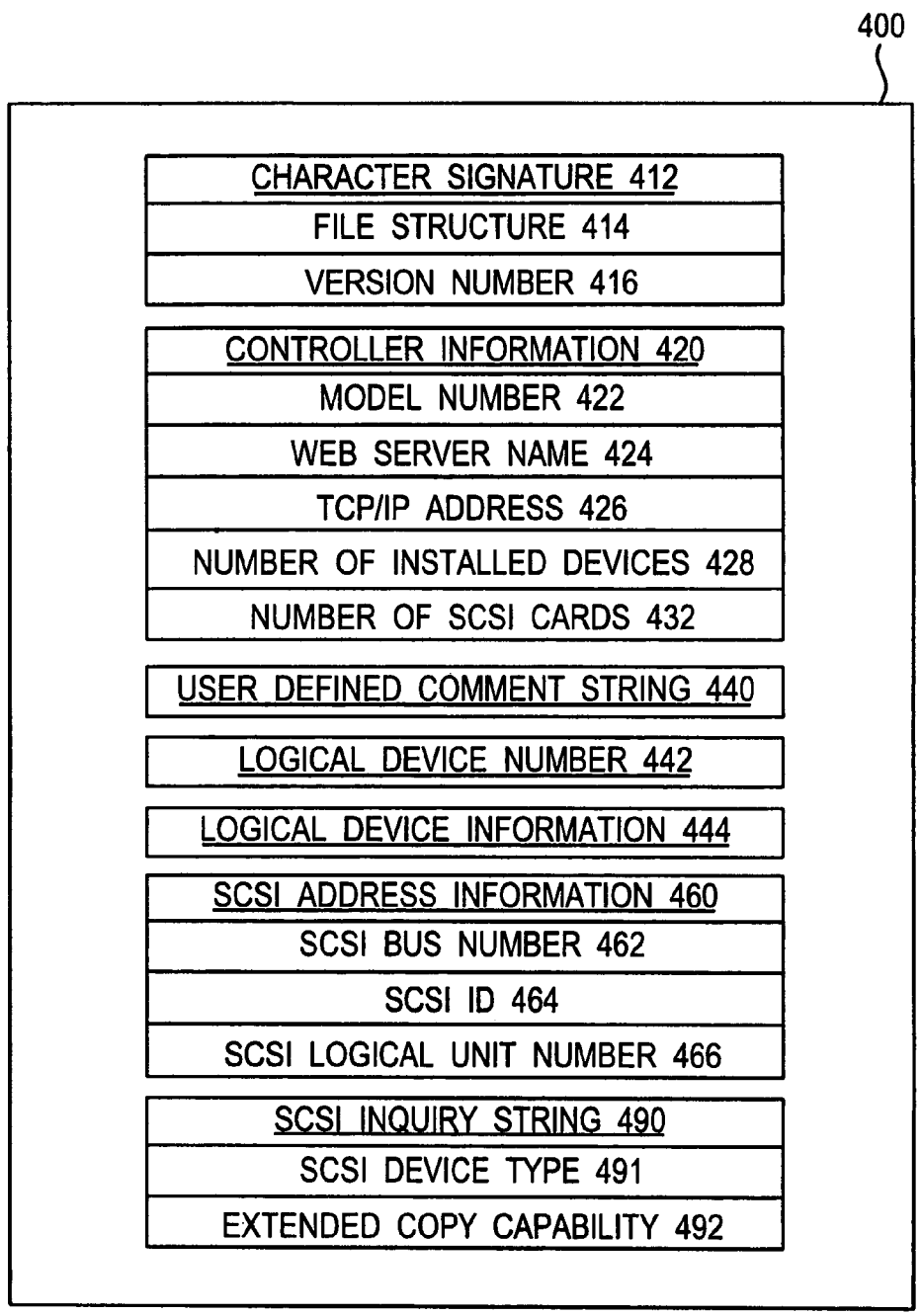
FIG. 4 is a table representing exemplary device information that might be used in one embodiment of the present invention to effect extended copy conversion.

FIG. 4 is a table 400 representing exemplary device information that might be used in one embodiment of the present invention to effect extended copy conversion. Such information may be stored in the extended copy command along with the list of capable devices (e.g., as shown in the list 201 of FIG. 2), and may include, e.g., virtual data storage device/physical disk, meta-data, capacity, and other personality issues. Those skilled in the art will recognize that the present invention is not meant to be limited to the specific information listed in the table 400 of FIG. 4. Rather, such data may include any metadata applicable to providing information about the system to enable the extended copy conversion to be effected. For example, without the table 400, the server may indicate the data is on "disk 21", but in actuality, the virtual storage device controller is mapping the data on "disk 10" to appear to be on "disk 21". The table 400 thus provides information about the system to enable actual physical information concerning the system to be gathered, as necessary.

In FIG. 4, the table 400 includes a character signature 412 for identifying the table 400 with an intermediary controller, including the file structure 414 and version number 416. The file version number may be used to identify the version of the table 400, in the event software changes are later made. The controller information 420 is the generic term for identifying information associated with the particular intermediary controller. The controller information 420 may include a model number 422 for indicating the type of intermediary controller that is attached, a web server name 424 for the intermediary controller, a TCP/IP address 426, the number of installed devices 428, wherein the number of installed devices the intermediary controller is truly managing may differ from the number of installed devices which are viewable to a given open system host (there might be other open system hosts attached in the setup), and the number of SCSI cards 432. While not shown in FIG. 4, the table 400 may also include information regarding the total number of devices that are actually hooked to the intermediary controller, the total number of controllers, how much cache memory does this intermediary controller have, performance statistics, etc. Accordingly, there may be multiple open system hosts all dealing with one controller, or there may be multiple controllers and multiple hosts.

The table 400 also includes generic fields for user defined comments strings 440 for indicating the physical location of the intermediary controller since the intermediary controller may be remotely located. A logical device number 442 identifies the particular intermediary controller within an intermediary controller system that the host is communicating with.

The table 400 provides logical device information 444. The logical device information fields 444 are repeated for every physical device on the system. The logical device information 444 includes SCSI address information 460. The SCSI address information 460 includes the SCSI bus number 462, the SCSI ID 464, and the SCSI logical unit number (LUN) 466.

Finally, the table 400 provides a SCSI inquiry string 490, which includes SCSI device type 491 and Extended Copy Capability 492.

In this way, the present invention, in its various embodiments, provides logical to physical drive mapping, and thereby a system and method for employing an extended copy command in a virtual storage device environment.

Those skilled in the art will appreciate that a software arrangement in the virtual data storage server may comprise various software structures having alternative threads and objects. While the embodiments described herein discuss the virtual data storage server and the software components thereof as being implemented in a single computer, in alternative embodiments, the functions performed by the virtual data storage server and software components thereof could be distributed across multiple computer platforms.

In the embodiments described herein, the DASD cache comprises magnetic hard disk drives. In alternative embodiments, the DASD cache could comprise any suitable non-volatile memory storage device known in the art. Still further, the tape library is described as comprising magnetic tape cartridges. However, in alternative embodiments, the tape library may comprise magnetic hard disk drives, optical disks, holographic storage units, and any other non-volatile storage medium known in the art that is suitable for archival and backup purposes.

The embodiments described herein are described with respect to logical and physical volumes stored as single files having a size of 250 Mb to 800 Mb. However, in alternative embodiments, the logical and physical volumes may be stored as groups of files having various sizes or as a single file having a size different from the sizes discussed above.

The foregoing description of the embodiments described herein has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing an extended copy operation of a physical drive reserved to a virtual controller, said method comprising:
   supplying a host computer;
   supplying an appliance, wherein said appliance is interconnected with said host computer;
   supplying an automated data storage library comprising a plurality of data storage devices, wherein said automated data storage library is interconnected with said appliance;
   providing a virtual controller comprising a drive image provider, a drive resource provider, a library image provider, and a library resource provider, wherein said drive image provider is disposed in said host computer, and wherein said drive resource provider is disposed in said appliance, and wherein said library image provider and said library resource provider are disposed in said data storage library;
   receiving by said virtual controller at least one extended copy command for copying from a device having extended copy capability;
   parsing by said virtual controller said at least one extended copy command;
   translating by said virtual controller said at least one extended copy command into at least one translated command; and
   sending said at least one translated command to a physical drive having extended copy capability.

2. A method as claimed in claim 1, further comprising sending a status message confirming completion of the extended copy operation on said physical drive.

3. A method as claimed in claim 1, wherein said device is a disk or tape drive.

4. A method as claimed in claim 1, wherein said physical drive is a disk or tape drive.

5. A data storage system, comprising:
   a server;
   a source device;
   a target device, said target device being a virtual storage device; and
   a virtual storage appliance in communication with said server, said source device and said target device, said virtual storage appliance comprising a drive image provider, a drive resource provider, a library image provider, and a library resource provider;
   said virtual storage appliance adapted to receive an extended copy command from said server for performing an extended copy operation from said source device, to parse said extended copy operation, to build at least one translated command capable of execution by said target device, and to transmit said at least one translated command to said target device.

6. A data storage system as claimed in claim 5, wherein said source device is a disk or tape drive.

7. A data storage system as claimed in claim 5, wherein said source device is a disk or tape drive.

8. A data storage system as claimed in claim 5, wherein said target device is a disk or tape drive.

9. A data storage system as claimed in claim 5, wherein said virtual storage appliance comprises a virtual storage device controller.

10. A data storage system as claimed in claim 9, wherein said virtual storage device controller is a virtual tape controller.

11. An extended copy-capable virtual storage system, comprising:
    a source device;
    a target device, said target device being a physical driver reserved to a virtual controller; and
    a virtual controller in communication with said server, said source device and said target device, said virtual controller comprising a drive image provider, a drive resource provider, a library image provider, and a library resource provider;
    said virtual controller capable of receiving at least one command to copy data from said source drive and translating said at least one command into at least one extended copy command for transferring data from said source drive to said target drive.

12. A system as claimed in claim 11, wherein data is transferred from said source drive to said target drive directly, without said data passing through said virtual controller.

13. A system as claimed in claim 11, wherein data is transferred from said source drive to said target drive indirectly, by passing through said virtual controller, if said target drive is not capable of receiving an extended copy command.

* * * * *